W. C. NIEMANN.
AUTOMOBILE SLED.
APPLICATION FILED JUNE 11, 1909.
954,130.
Patented Apr. 5, 1910.
3 SHEETS—SHEET 2.
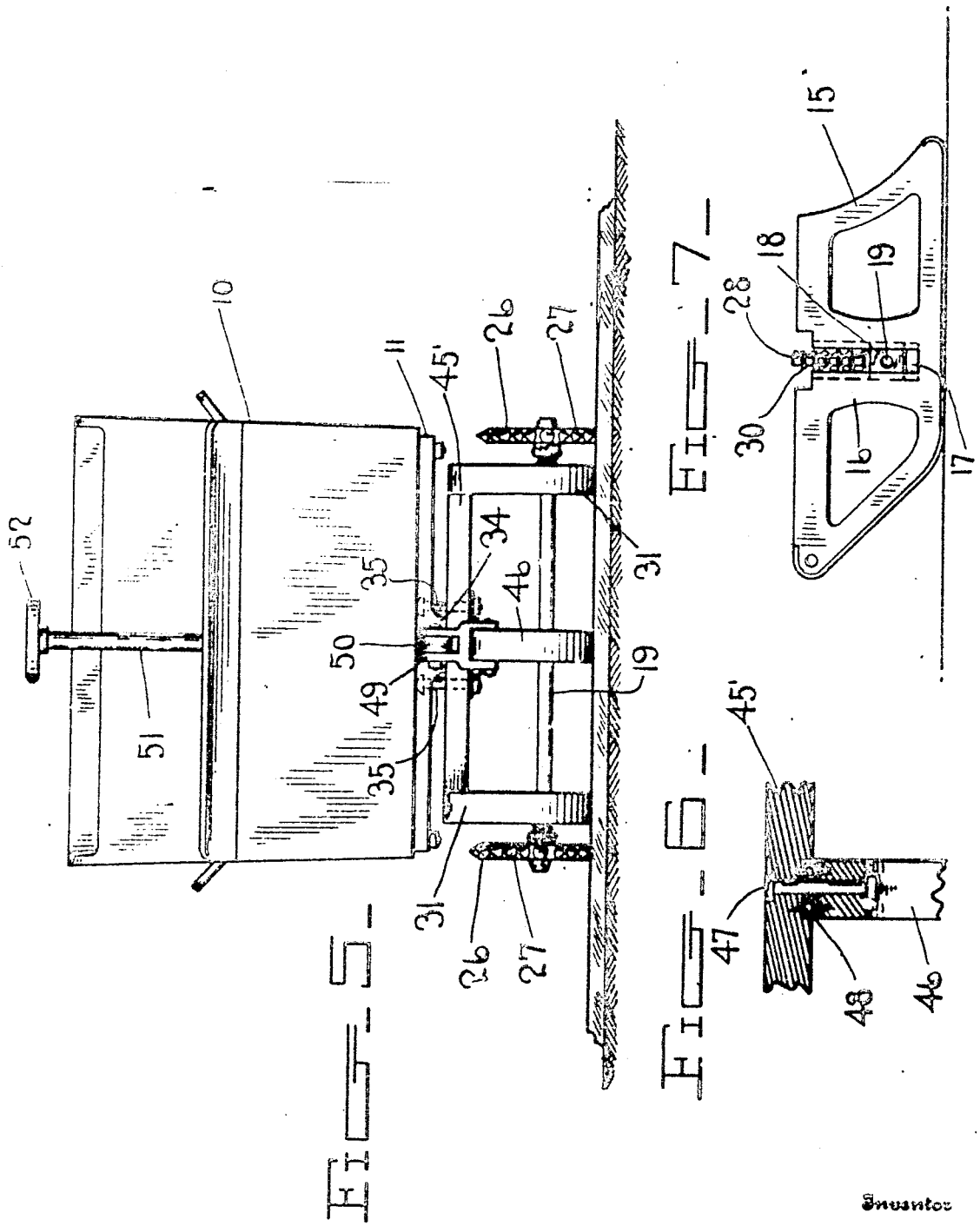
Witnesses
L. B. James
Inventor
William C. Niemann
Attorneys

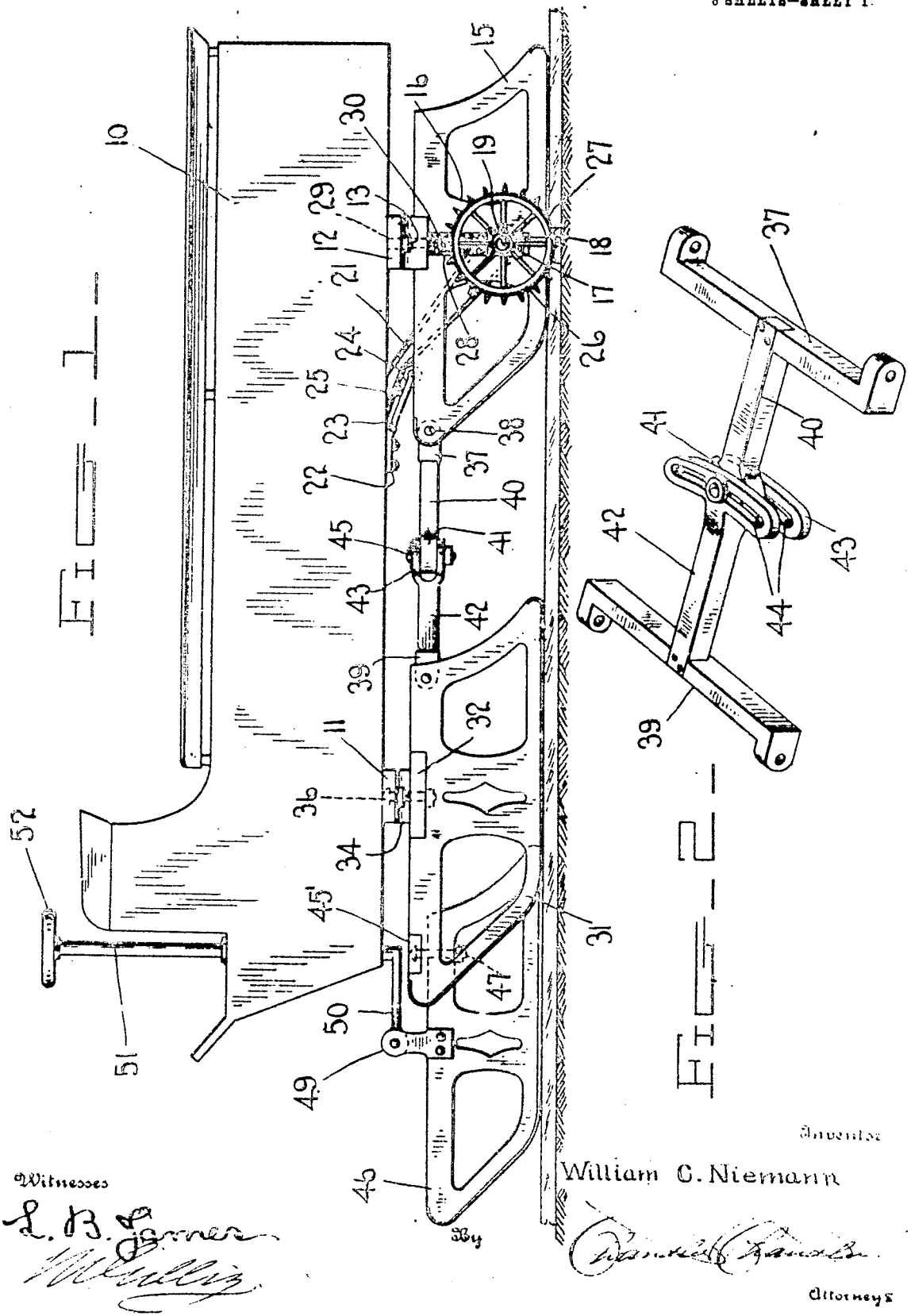

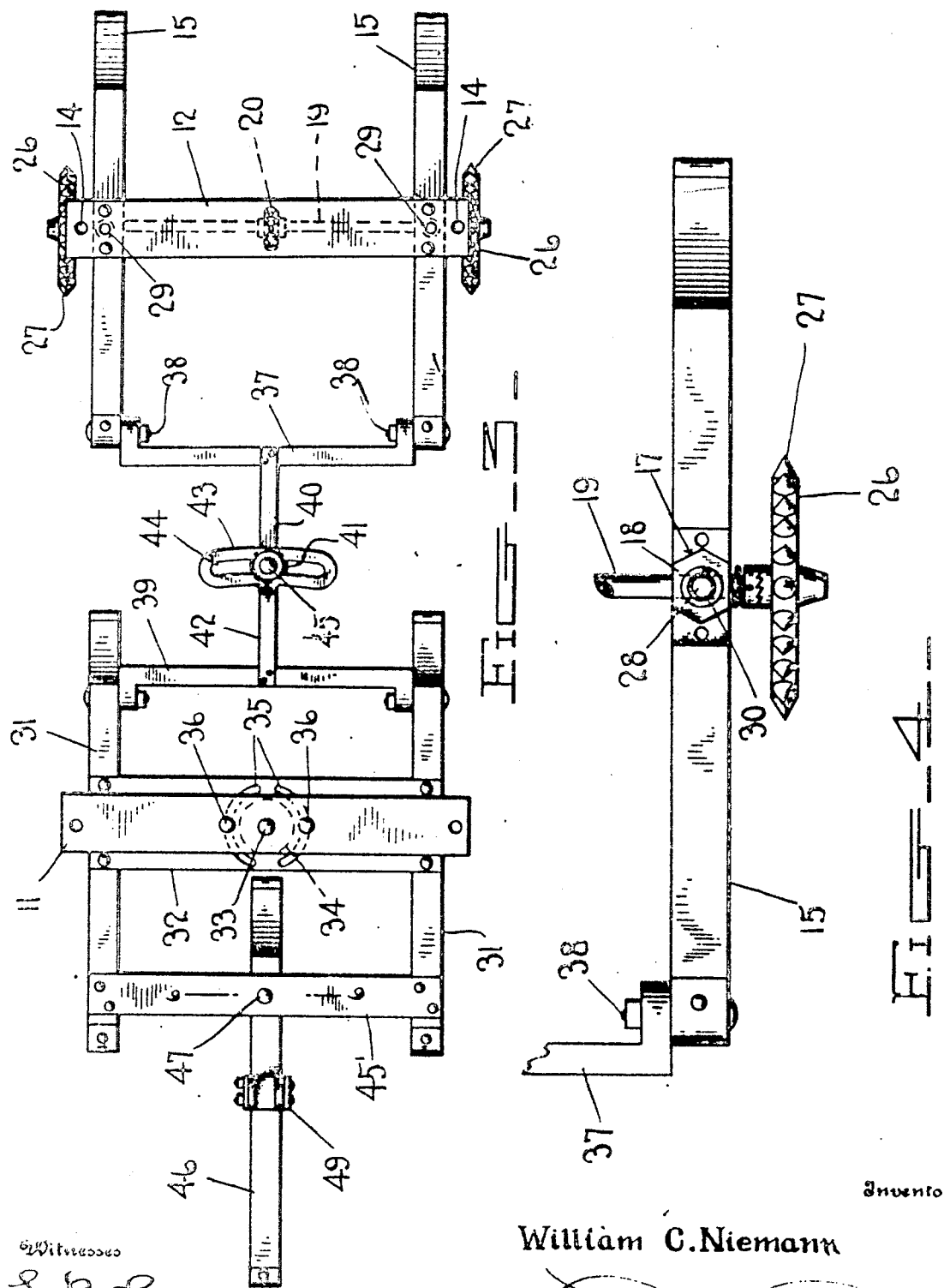

UNITED STATES PATENT OFFICE.

WILLIAM C. NIEMANN, OF WALTZ, MICHIGAN.

AUTOMOBILE-SLED.

954,130.

Specification of Letters Patent. Patented Apr. 5, 1910.

Application filed June 11, 1909. Serial No. 501,582.

*To all whom it may concern:*

Be it known that I, WILLIAM C. NIEMANN, a citizen of the United States, residing at Waltz, in the county of Wayne, State of Michigan, have invented certain new and useful Improvements in Automobile-Sleds; and I do hereby declare the following to be a full, clear, and exact description of the invention, such as will enable others skilled in the art to which it appertains to make and use the same.

This invention relates to vehicles and has special reference to a sled designed to be driven across a frozen surface by means of certain tractor wheels.

One object of the invention is to improve the general construction of devices of this character.

A second object of the invention is to provide an improved form of coupling between the fore and rear bobs of such a sled.

A third object of the invention is to provide a novel form of steering gear for use with a sled of this character.

A fourth object of the invention is to provide an improved form of driving gear for a sled of this character.

With the above and other objects in view the invention consists in general of a pair of sled bobs connected together in an improved manner and provided with novel driving and steering mechanism.

The invention further consists in certain novel details of construction and combinations of parts hereinafter fully described, illustrated in the accompanying drawings, and specifically set forth in the claims.

In the accompanying drawings, like characters of reference indicate like parts in the several views, and:—Figure 1 is a side elevation of an automobile sled constructed in accordance with this invention. Fig. 2 is a detail perspective view of the coupling between the front and rear bobs. Fig. 3 is a plan view of such a sled with the sleigh body removed. Fig. 4 is an enlarged sectional view through one of the rear runners. Fig. 5 is an end elevation of a sled of this character. Fig. 6 shows the method of connecting the steering runner to the front bob. Fig. 7 is a detail side elevation of one of the rear runners with the driving wheels removed.

The numeral 10 indicates a sleigh body and this sleigh body may be of any preferred construction. In this sleigh body is supported the driving machinery which may be of any type desired and which is not deemed necessary here to be shown inasmuch as the same forms no part of the present invention. The sleigh body 10 is supported on a front bolster 11 and a rear bolster 12 being secured thereto by means of suitable bolts 13 passing through apertures 14 in the front and rear bolsters. Rigidly connected to the rear bolster adjacent each end thereof is a sleigh runner 15 having a pair of spaced centrally disposed vertical braces and guide standards 16. These braces or guide standards are provided on their proximal faces with V-shaped grooves 17. Slidably mounted between each pair of the guides 16 is a bearing 18, each of the bearings supporting one end of a shaft 19. Upon the shaft 19 is a sprocket 20 and a chain 21 passes over this sprocket and is led to the driving mechanism, which as before stated is not deemed necessary to be shown. In order to provide for keeping the tension of the chain 21 constant while the bearings 18 slide up and down in the space between the guides there is mounted on the body 10 a bracket 22 pivotally attached to which is an arm 23 carrying on its outer end a belt tightening roll 24 and this arm 23 is normally forced downward by means of a compression spring 25 one end of which bears against the body 10 and the other end against the arm. The means here described are the means for rotating the shaft 19.

Secured upon each end of the shaft 19 outside of the bearings 18 is a tractor wheel 26 provided with cone shaped tractor teeth 27 adapted to engage in the snow or ice over which the vehicle is moving. In order to keep these tractor wheels firmly pressed down into the snow or ice the bearings 18 are each provided with an upwardly extending stem 28 guided at its upper edge in a suitable perforation 29 made in the rear bolster 12. Surrounding each of these stems 28 is a strong spiral compression spring 30 which normally forces the bearings 18 and the wheels 26 downward thus insuring that the points 27 of the tractor teeth shall engage firmly in the ice or snow over which it is desired to move the vehicle.

At the front of the vehicle there is provided a pair of spaced sleigh runners 31 which are connected by a front bob bolster 32. The bolsters 11 and 32 are secured together by means of a king bolt 33 so that the bolster 32 with the front bob may swivel on said king bolt. In order to hold these bolsters in spaced relation the bolster 11 is provided with a downwardly projecting portion 34 and in order to prevent tilting of the bolster 11 on the bolster 32 the latter is provided with a pair of opposed arcuate slots 35 wherethrough pass bolts 36 the upper ends of which are received in suitable apertures formed in the bolster 11.

In order to prevent strain being brought on the body by the draft the two bobs are connected together and this connection comprises a yoke member 37 pivoted to each of the runners 15 as indicated at 38. This yoke member thus not only forms one of the attachments for the front bob but also serves to hold the front ends of the runners 15 in spaced relation and receives the stresses on the bolts which attach the same to the rear bolster. Attached in a similar manner to the front bob 31 is a yoke 39. Extending from the member 37 is a centrally disposed and forwardly directed bar 40 provided with an enlarged head 41 having a suitable aperture therethrough. Extending from the member 39 is a centrally disposed and rearwardly projecting bar 42 provided with a pair of spaced arcuate heads 43 each of which has extending longitudinally thereof an arcuate slot 44. A bolt or pin 45 extends through the arcuate slot and the aperture in the head 41 so that these parts are connected firmly together while at the same time the two bobs are allowed to assume different angular positions with relation to each other as is necessary in going around corners and turning other curves. By means of this construction if one of the bobs goes over an obstruction it will rise and fall and not strain the connection between the two bobs.

Upon the front bob is a cross bar 45' and held beneath this cross bar is a steering runner 46. The runner 46 is held upon the cross bar 45' by means of a bolt 47 which passes through suitable ball and socket bearings 48 so that the runner may be readily turned with reference to the cross bar 45' and to the front bob. In order to turn this runner the upper member thereof is provided with brackets 49 and to these brackets and extending rearwardly along the runner is connected an arm 50 which is carried on a steering shaft 51 provided with a steering wheel 52 of any preferred form. This steering shaft 51 is located immediately above and in alinement with the pivot point of the steering runner so that the steering is attended with the greatest ease.

In the operation of this device when it is desired to turn the sleigh to go around a corner it is merely necessary to actuate the steering wheel 52 when the steering bob will be turned in conformity therewith. This will tend to turn the front bob, this being permitted as previously described by means of the pin and slot connection between the two bobs, and the entire sleigh will thus be directed in the desired track.

There has thus been provided a simple and efficient device of the kind described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new, is:—

1. In a sleigh, a body, a rear bob fixedly secured thereto, a front bob pivotally mounted on the body, a yoke pivoted to each of said bobs to swing in a vertical plane, an arm projecting from one of said yokes provided with an apertured end, a second arm extending from the other yoke provided with an end having a horizontally arcuate slot, and a pin passing through said apertured end and arcuate slot.

2. In a sleigh, a body, a rear bob fixedly secured thereto, tractor wheels mounted on the rear bob, springs normally pressing said tractor wheels downward, means to actuate said tractor wheels, a front bob pivotally mounted on the body, a yoke pivoted to each of said bobs to swing in a vertical plane, an arm projecting from one of said yokes provided with an apertured end, a second arm extending from the other yoke provided with an end having a horizontally arcuate slot, a pin passing through said apertured end and arcuate slot.

3. In a sleigh, a body, a rear bob fixed thereto, tractor wheels supported on the rear bob, springs carried on said rear bob to normally force said tractor wheels downward, means to operate said tractor wheels, a front bob pivoted to the body, a universally jointed connection between said bobs, a steering runner supported on the front bob, and operative means for said steering runner.

In testimony whereof, I affix my signature, in presence of two witnesses.

WILLIAM C. NIEMANN.

Witnesses:
 ERNEST H. HEIER,
 AUGUST J. PEOTRASCHKE.